(12) United States Patent
Tsuruno

(10) Patent No.: US 7,715,801 B2
(45) Date of Patent: May 11, 2010

(54) WIRELESS COMMUNICATION DEVICE AND RADAR DETECTION METHOD THEREFOR

(75) Inventor: Makoto Tsuruno, Tokyo (JP)

(73) Assignee: NEC Corporation, Tokyo (JP)

( * ) Notice: Subject to any disclaimer, the term of this patent is extended or adjusted under 35 U.S.C. 154(b) by 834 days.

(21) Appl. No.: 11/225,020

(22) Filed: Sep. 14, 2005

(65) Prior Publication Data

US 2006/0058035 A1    Mar. 16, 2006

(30) Foreign Application Priority Data

Sep. 15, 2004   (JP)   ............... 2004-267649

(51) Int. Cl.
*H04B 1/00*   (2006.01)
*H04B 7/00*   (2006.01)

(52) U.S. Cl. .................. 455/69; 455/67.11; 455/70; 455/522

(58) Field of Classification Search ............... 455/67.11, 455/69, 70, 454, 512, 522

See application file for complete search history.

(56) References Cited

U.S. PATENT DOCUMENTS

2005/0059364 A1 *   3/2005   Hansen et al. ........... 455/127.4

FOREIGN PATENT DOCUMENTS

| EP | 1 515 488 A | | 3/2005 |
|---|---|---|---|
| JP | 6-37762 A | | 2/1994 |
| JP | 2001-237847 A | | 8/2001 |
| JP | 2001-285301 A | | 10/2001 |
| JP | 2002-135831 A | | 5/2002 |
| JP | 2003-60649 A | | 2/2003 |
| WO | WO 03/030577 A1 | | 4/2003 |
| WO | 03/050560 A1 | | 6/2003 |
| WO | WO 2004/017536 A2 | | 2/2004 |
| WO | WO 2004/073189 | * | 8/2004 |
| WO | WO 2004/073189 A1 | | 8/2004 |

* cited by examiner

*Primary Examiner*—Nay A Maung
*Assistant Examiner*—Tuan H Nguyen
(74) *Attorney, Agent, or Firm*—Sughrue Mion, PLLC

(57) ABSTRACT

A wireless communication device includes a receiver circuit that receives a wireless signal. Here, the wireless signal includes a signal from a node in a communication network to which the wireless communication device belongs and a radar signal. The receiver circuit detects a received power of the wireless signal. The wireless communication device further includes a radar signal detection circuit, coupled to the receiver circuit, which determines if the wireless signal comprises the radar signal based on the received power of the wireless signal.

18 Claims, 5 Drawing Sheets

WIRELESS COMMUNICATION DEVICE AND RADAR DETECTION METHOD THEREFOR

This application claims priority to Japanese Patent Application 2004-267649 filed on Sep. 15, 2004 in the Japanese Patent Office, the disclosure of which is incorporated herein by reference in its entirety.

BACKGROUND OF THE INVENTION

1. Technical Field

The present invention relates to a wireless communication device and a radar detection method therefore.

2. Background Art

As Japanese Patent Application Laid-Open No. 2002-135831 shows, generally, a wireless communication system is required to detect a radar signal where the radar works using the same frequency band as that of the communication system. Thus, a wireless communication system sharing the same band with a radar monitors if the radar signal is present all the time, both before and after the start of its operation in order to avoid obstructing an operation of the radar system.

Also, the wireless communication system, if it detects the presence of any radar signal during its radar signal monitoring, promptly shifts its own operation channel to another channel (i.e., to a frequency other than that of the radar signal). It is difficult to detect such radar signals by using expected patterns of radar signals in advance and providing detection circuits for detecting pattern matching between patterns of radio signals and the expected patterns because there are a wide variety of radar signals.

Furthermore, in order to perform radar detection, a wireless communication device has a receiver for radar detection in addition to a receiver for a communication system, providing many disadvantages in the aspects of hardware size and cost.

Also, a conventional wireless communication system, when performing radar detection, stops its own communication in the same band as that of radar signals to be detected, resulting in degradation in an efficiency of the communication.

SUMMARY OF THE INVENTION

Accordingly, an aspect of the present invention is to provide a wireless communication device that performs radar signal detection without significantly degrading an efficiency of communication between the wireless communication device and a node.

Another aspect of the present invention is to provide a wireless communication device that performs radar signal detection by using a receiver that receives a signal from a node with which the wireless communication device communicates.

Implementation of the present invention can be achieved in varied ways and is not limited to the exemplary embodiments described herein.

BRIEF DESCRIPTION OF THE DRAWINGS

These and other aspects of the present invention will become better understood with reference to the following description and accompanying drawings, which should not be read to limit the invention in any way, in which.

DETAILED DESCRIPTION OF THE EXEMPLARY EMBODIMENT OF THE INVENTION

Figure 1:
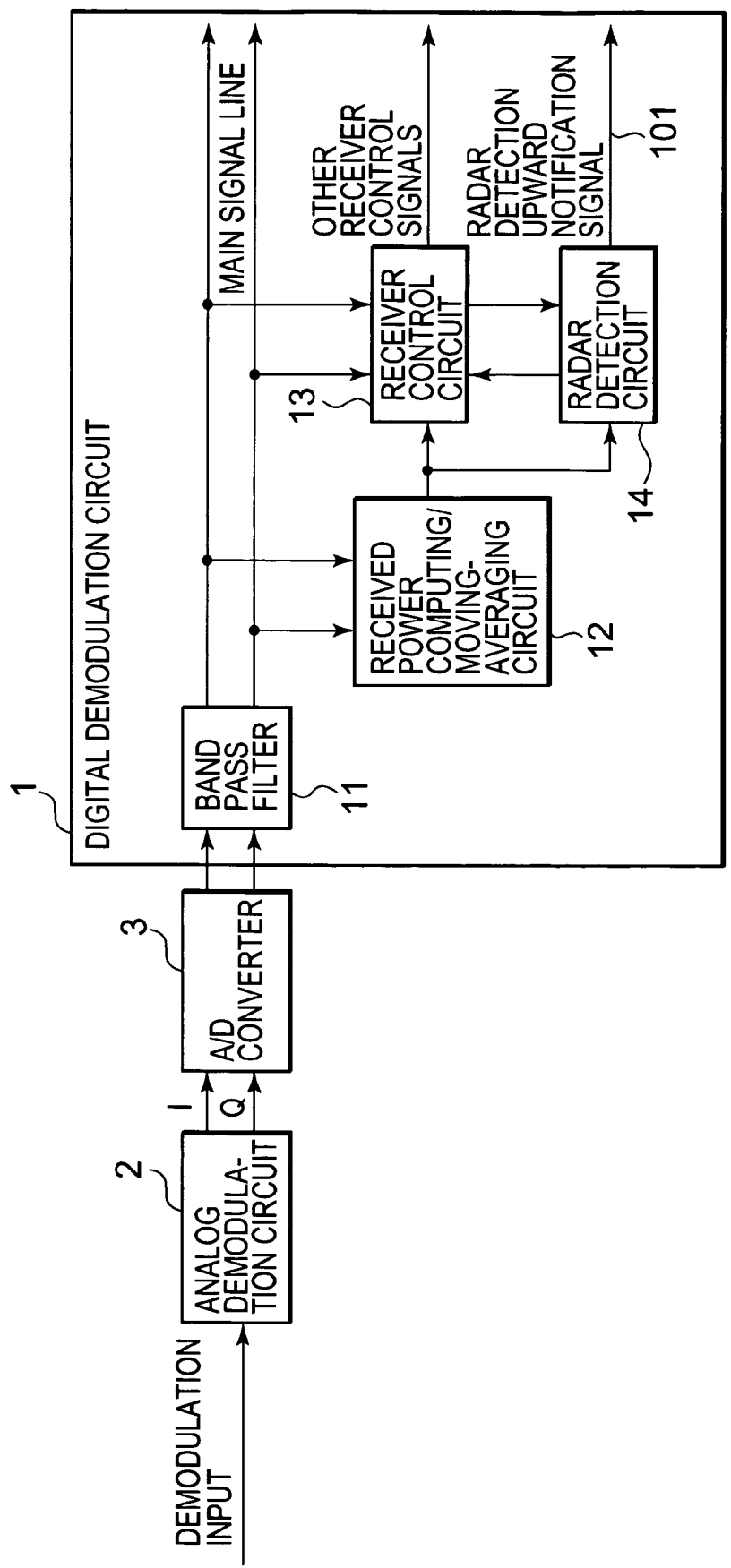
FIG. 1 shows a configuration of a receiver unit of a wireless communication device, according to an exemplary embodiment of the present invention.

Several exemplary embodiments are described to assist in the understanding of the present invention and are not intended to limit the scope of the invention in any way.

According to an exemplary embodiment of the present invention, a wireless communication device communicates with a node in a communication network. For example, the communication network may be a wireless local area network (LAN), cellular phone network or any other network as would be understood in the art. Furthermore, the wireless communication device and the node may be an access point or a base station, a wireless terminal or a mobile terminal or any other type of nodes, as would be understood in the art, that communicate with each other.

The wireless communication device receives a wireless signal and detects received power of the wireless signal. The wireless signal comprises a signal from the node. Furthermore, where a radar signal is transmitted, the wireless signal may further comprise the radar signal. Here, the signal from the node may be based on orthogonal frequency division multiplexing (OFDM) or any other modulation technique as would be understood in the art.

Further, the wireless communication device determines if the wireless signal comprises the radar signal based on the received power of the wireless signal.

For example, the wireless communication device may determine that the wireless signal comprises the radar signal if the received power becomes lager than a predetermined first value and subsequently becomes smaller than a predetermined second value in a predetermined period of time. The predetermined first value may be the same as or different from the predetermined second value. Also, the wireless communication device may determine that the wireless signal does not comprise the radar signal if the received power becomes lager than the predetermined first value but does not subsequently become smaller than the predetermined second value in the predetermined period of time.

On the other hand, the wireless communication device may determine that the wireless signal comprises the radar signal if the wireless signal does not comprise a signal with a predetermined pattern. The signal with the predetermined pattern may be detected by the wireless communication device and may be a preamble signal for synchronizing the wireless communication device with the node or any other purpose as would be understood in the art.

Also, the wireless communication device may determine that the wireless signal comprises the radar signal if the received power becomes lager than a predetermined first value and subsequently becomes smaller than a predetermined second value in a predetermined period of time and the wireless signal does not comprise the signal with the predetermined pattern.

Accordingly, the wireless communication device may perform radar signal detection without degrading an efficiency of the communication between the wireless communication device and the node. Furthermore, the wireless communication device may change the frequency of the signal from the node to a frequency other than that of the radar signal based on the radar detection.

FIG. 1 is a block diagram showing a configuration of a receiver unit of a wireless communication device according to an exemplary embodiment. In FIG. 1, the wireless communication device applies to a wireless LAN system. The wireless communication device comprises, an analog demodulation circuit 2, an A/D (analog-to-digital) converter 3 and a digital demodulation circuit 1. The wireless communication device receives signals and demodulates them by using those circuits. Here, a wireless communication device may apply to any other communication network as would be understood in the art.

With regard to the digital demodulation circuit 1, only the parts relevant to the present invention are shown. Thus, the digital demodulation circuit 1 includes a band pass filter 11, an received power computing/moving-averaging circuit 12, a receiver control circuit 13 and a radar detection circuit 14. Each of the circuits in the digital demodulation circuit 1 may comprise a circuit, a combination of circuits or a combination of circuits and software as would be understood in the art.

The received signals are converted into digital signals having a predetermined frame format and based on OFDM, wherein data is dispersed and transmitted via plural frequencies (subcarriers) in parallel with each subcarrier being modulated by 16-position Quadrature Amplitude Modulation (16QAM), Quadrature Phase Shift Keying (QPSK) or the like. Here, any other modulation method may apply to the signals in the exemplary embodiment as would be understood in the art.

In FIG. 1, the received signals (analog signals) are first separated by the analog demodulation circuit 2 into an in-phase component I and a quadrature-phase component Q, and each component is converted by the A/D converter 3 into digital signals.

In the digital demodulation circuit 1 at the later stage, after the band pass filter 11 attenuates signal components outside the band, demodulation processing continues to be performed on the main signal line. The signals which pass the band pass filter 11 are input to the received power computing/moving-averaging circuit 12 and the receiver control circuit 13 for the control of reception or radar detection.

In the received power computing/moving-averaging circuit 12, for instance, received signal power is computed by adding the square of the I component and that of the Q component of the demodulated signals, and moving-averaging is further calculated. Here, the moving-averaging is used in order to reduce fluctuations of the received power of the wireless LAN system which uses the OFDM system, subject to greater power dispersion. However, it is not necessarily required to use the moving-averaging and the received power may be calculated in any other manner as would be understood in the art.

The receiver control circuit 13 controls demodulation with its receiver control circuit 13. Furthermore, the receiver control circuit 13 further controls the operational timing of the radar detection circuit 14. The radar detection circuit 14 determines if the radar signals are present or not (i.e., if the radar signals are included in the received signals) on the basis of the output of the received power computing/moving-averaging circuit 12. Subsequently, if any radar signal is detected, the radar detection circuit 14 notifies an higher level of the communication protocol of the detection of the radar signal by outputting a radar detection upward notification signal 101.

At the higher level of the communication protocol, in response to receiving notification of the radar signal detection, an action of radar avoidance in accordance with, for instance, the Institute of Electrical and Electronic Engineers (IEEE) 802.11h standard is taken. For example, as a result of the radar avoidance, the wireless communication device stops using the same frequency (a channel) as that of the radar signal and start using a frequency (a channel) other than that of the radar signal for communication in the communication system.

Figure 2:
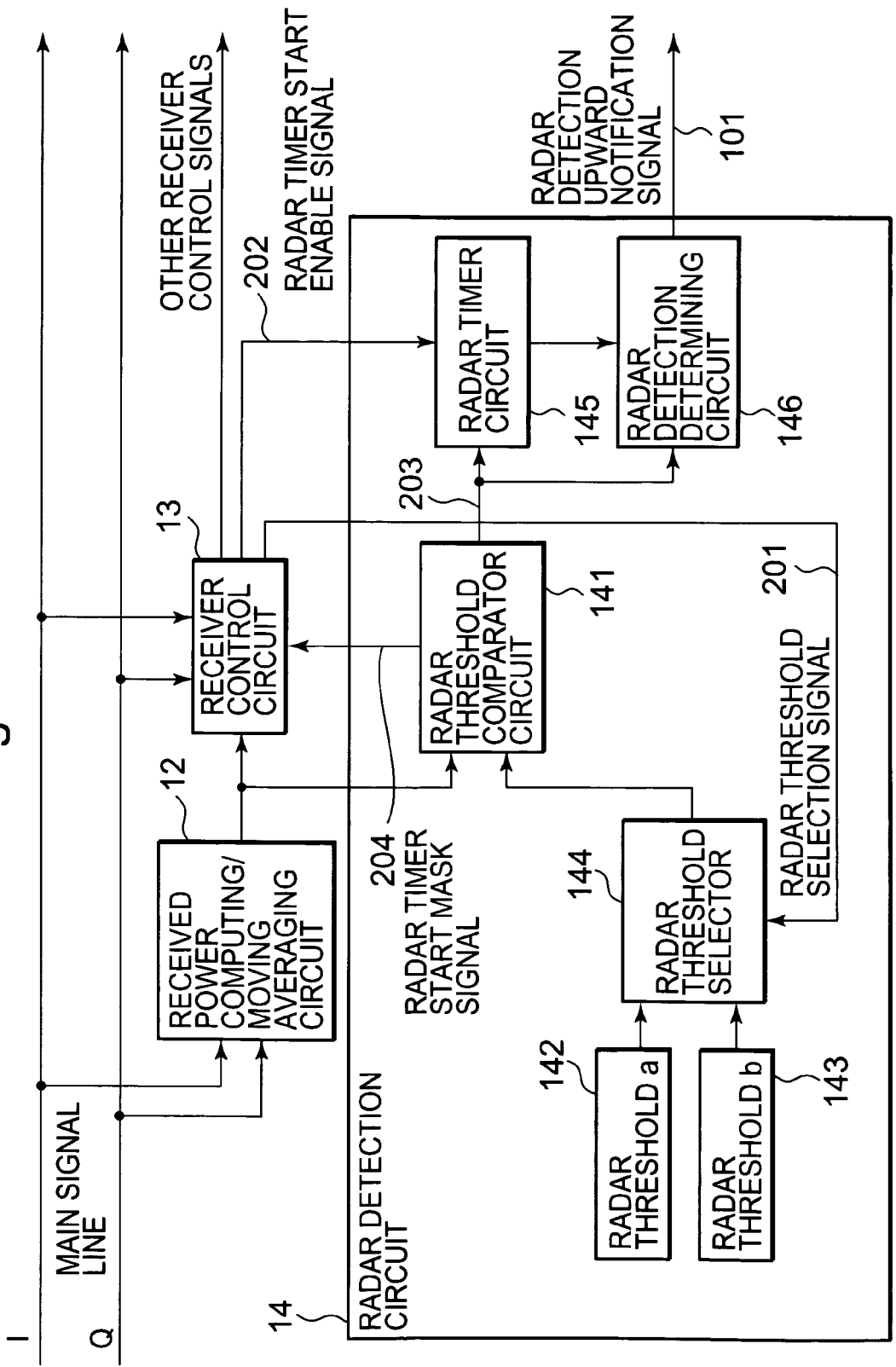
FIG. 2 shows a detailed configuration of a radar detection circuit 14 of FIG. 1.

FIG. 2 is a block diagram showing a detailed configuration of the radar detection circuit 14 of FIG. 1. In FIG. 2, the same constituent parts as in the receiver unit of the wireless communication device shown in FIG. 1 are assigned respectively the same reference number. In this FIG. 2, the radar detection circuit 14 includes a radar threshold comparator circuit 141, a radar threshold "a" holding circuit 142, a radar threshold "b" holding circuit 143, a radar threshold selector 144, a radar timer circuit 145 and a radar detection determining circuit 146. Each of those circuits in the radar detection circuit 14 may comprise a circuit, a combination of circuits or a combination of circuits and software as would be understood in the art.

The radar threshold comparator circuit 141 compares the output of the received power computing/moving-averaging circuit 12 with a radar threshold "a" or a radar threshold "b" from the radar threshold "a" holding circuit 142 or the radar threshold "b" holding circuit 143, respectively. The radar threshold selector 144 selects one of the radar threshold "a" or the radar threshold "b" to be used by the radar threshold comparator circuit 141 based on a radar threshold selection signal 201 from the receiver control circuit 13. These radar thresholds "a" and "b" are defined in advance, and the radar threshold "a" is used for detecting a radar signal power rise, and the radar threshold "b" is used for detecting a radar signal power fall.

The radar timer circuit 145 judges if to start a radar timer operation according to the output of the radar threshold comparator circuit 141 and a radar timer start enable signal 202 from the receiver control circuit 13. In the radar timer operation, a time-out comes when either a signal constituting a stopping factor is inputted or a pre-defined time-out period that may be approximately equal to the maximum pulse width of a radar signal expires and then the radar timer is reset.

The radar detection determining circuit 146 determines if a radar signal is detected according to the output of the radar threshold comparator circuit 141 and the state of the radar timer circuit 145. Subsequently the radar detection determining circuit 146, if it determines that a radar signal is detected, outputs the radar detection upward notification signal 101 to the higher level of the communication protocol.

Figure 3:
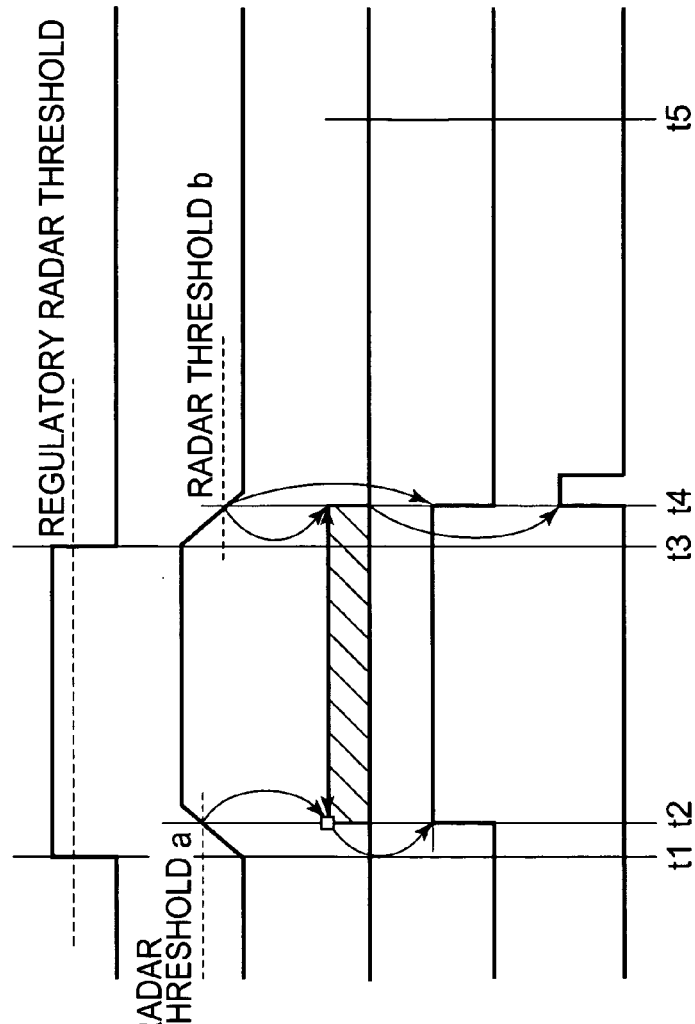
FIG. 3 shows a time chart of an operation of radar detection, according to an exemplary embodiment of the present invention.
Figure 4:
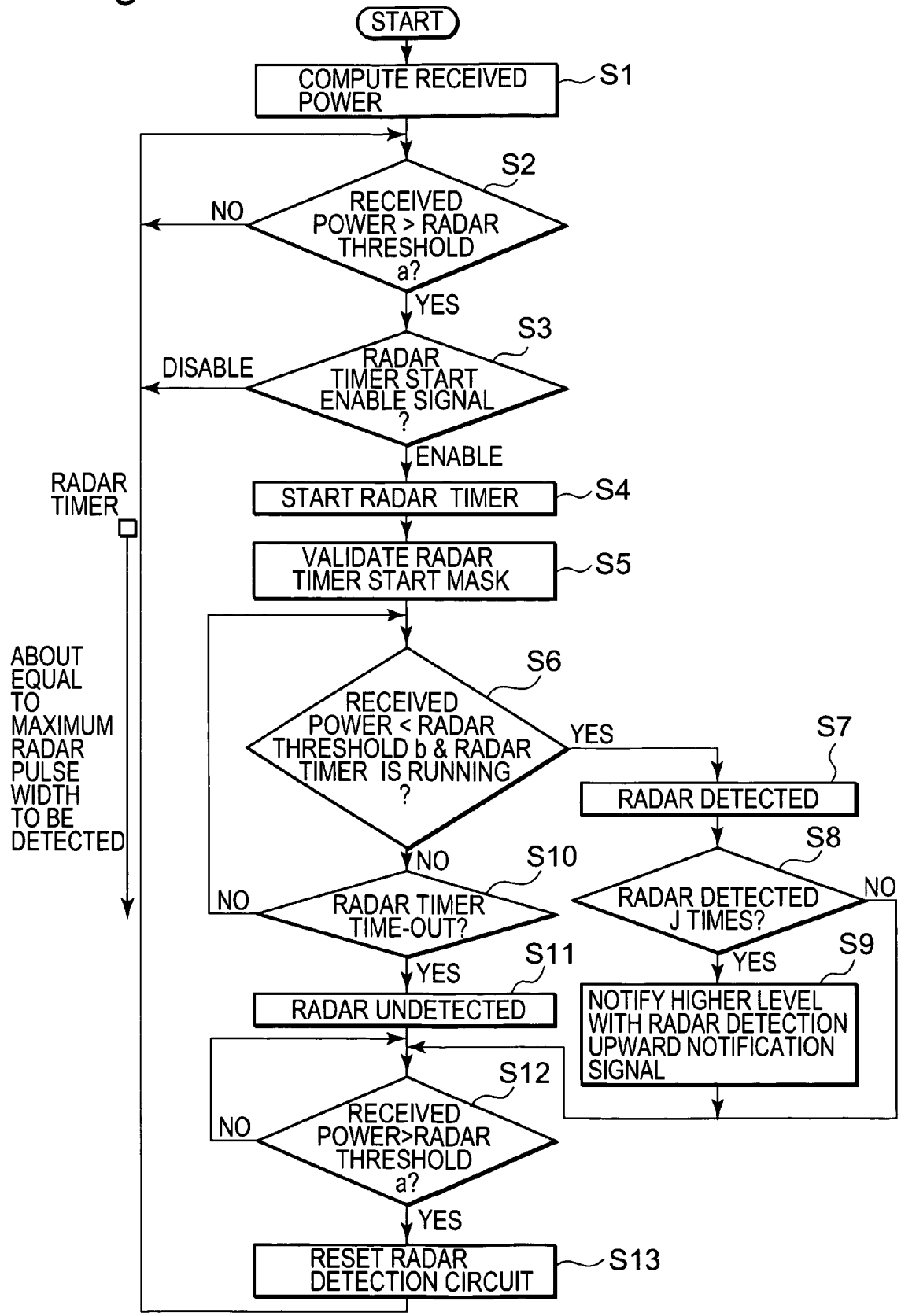
FIG. 4 shows a flow chart of an operation of radar detection, according to an exemplary embodiment of the present invention.
Figure 5:
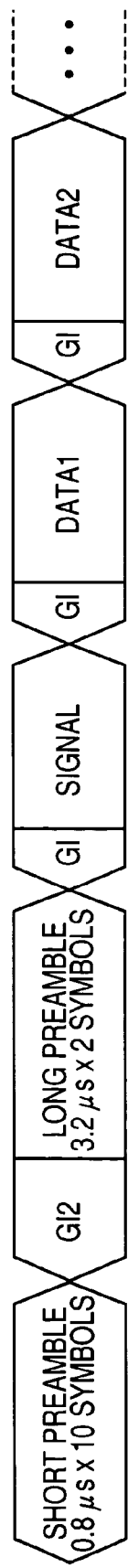
FIG. 5 shows a frame format of a signal for communication, according to an exemplary embodiment of the present invention.

FIG. 3 shows a time chart of an operation of radar detection, according to an exemplary embodiment of the present invention. FIG. 4 shows a flow chart of an operation of radar detection, according to an exemplary embodiment of the present invention. FIG. 5 shows a frame format of a signal for communication, according to an exemplary embodiment of the present invention. The operation of radar detection according to an exemplary embodiment will be described with reference to FIG. 1 through FIG. 4. The operation of radar detection may be realized, for instance, by a central processing unit (CPU) which reads a program stored in a read only memory (ROM) and executes the program by using a random access memory (RAM), as well as a hardware circuit.

Now it is assumed that, as shown by a solid line in FIG. 3(a), radar signals whose received power exceed a regulatory radar threshold, which is a value predetermined for each geographical area so that both a communication system and a radar system can be used in each area, is inputted to the received power computing/moving-averaging circuit 12 during a period of time t1 to t3.

The received power computing/moving-averaging circuit 12 calculates the received power (step S1 in FIG. 4), calculates a moving-average value of calculated received power, and outputs the moving-average value.

Accordingly, the output of the received power computing/moving-averaging circuit 12 begins to rise at the point of time t1 as shown by a solid line in FIG. 3(b). Subsequently, the output of the received power computing/moving-averaging circuit 12 exceeds a radar threshold "a" shown by a broken line in FIG. 3(b) at the point of time t2. The radar threshold "a" is inputted to the radar threshold comparator circuit 14. Subsequently, the radar threshold comparator circuit 141 outputs a radar timer start signal 203 to the radar timer circuit 145 (step S2 in FIG. 4). It is to be noted that this radar threshold "a" is a threshold for identifying a rise of a radar signal pulse; for instance, the radar threshold "a" may be the predetermined radar threshold for each geographical area as described above. Here, the radar threshold selector 144 in its initial state selects the radar threshold "a".

The radar timer circuit 145, if the radar timer start signal 203 is input, starts the radar timer as shown by an arrow in FIG. 3(c). However, if the receiver control circuit 13 outputs the radar timer start enable signal 202 that indicates "disable" for one reason or another, the radar timer start signal 203 is masked and the radar timer is not started (steps S3 and S4 in FIG. 4). Here, once the radar timer is started, the radar threshold selector 144 selects the radar threshold "b".

After the start of the radar timer, since there are no longer any radar signals input to the received power computing/moving-averaging circuit 12 at the point of time t3 as shown by a solid line in FIG. 3(a), the output of the received power computing/moving-averaging circuit 12 begins to reduce as shown by a solid line in FIG. 3(b), and goes below the radar threshold "b" shown by a broken line in FIG. 3(b). The radar threshold "b" is input to the radar threshold comparator circuit 141 at the point of time t4.

After the output of the received power computing/moving-averaging circuit 12 goes below the radar threshold "b", the radar detection determining circuit 146 checks if the radar timer is running at the point of time t4. Accordingly, if the radar timer is running, the radar detection determining circuit 146 determines that a radar signal is detected, and outputs a radar detection signal as shown by a solid line in FIG. 3(e) for instance (steps S6 and S7 in FIG. 4). In addition, the radar timer circuit 145 resets the radar time after receiving a signal, which is output from the radar detection determining circuit 146, notifying that the received power of the radar signal went below the radar threshold "b" (steps S12 and S13 in FIG. 4).

On the other hand, unless a signal, such as the signal notifying that the received power of the radar signal went below the radar threshold, which may be a trigger to stop the radar timer is received, the radar timer keeps running until the predetermined time-out period expires (at the point of time t5). Subsequently the radar time is reset. Therefore, the expiration of the predetermined time-out period means that no radar signal is detected (steps S6, S10 and S11 in FIG. 4).

According to an exemplary embodiment, a radar counter (not shown) in the radar detection determining circuit 146 or provided at the higher level of the communication protocol counts up the number of radar signal detections on the basis of the radar detection signal obtained at step S7. Accordingly, if number of radar signal detections exceeds J times, which is a predetermined threshold value, within a certain period of time (step S8 in FIG. 4), the radar detection determining circuit 146 outputs the radar detection upward notification signal 101 to the higher level of the communication protocol and then the radar counter is reset (step S9 in FIG. 4). Here, the number of radar detections within a certain period of time is counted by periodically polling and resetting the radar counter.

The foregoing is a basic flow of a radar detection and a notification of its result to the higher level of the communication protocol.

According to an exemplary embodiment, the number for erroneous radar detections may be reduced by having two or more different radar thresholds to be input to the radar threshold comparator circuit 141. The radar threshold selector 144 selects the radar threshold "a" or the radar threshold "b". The radar threshold "a" may be the same as the regulatory radar threshold in the pertinent geographical area, for detecting a rise of a radar signal pulse. The radar threshold "b" may be a lower level than the radar threshold "a", for detecting a fall of a radar signal pulse. The selection of radar threshold makes it possible to detect a rise of a radar signal pulse when received power of the radar signal exceeds the regulatory radar threshold even slightly and to detect a fall of the radar signal pulse when the received power of the radar signal undoubtedly goes below the regulatory radar threshold. This is a particularly useful method for reducing the number of erroneous radar detections when the dispersion of receive power is significant as in a wireless LAN system (OFDM-modulated). However, the radar thresholds for detection of a rise and a fall of a radar signal pulse are not necessarily different, and may be the same value as each other.

According to the exemplary embodiment, the receiver control circuit 13 outputs the radar timer start enable signal 202, which indicates if the radar timer can be started, which may reduce the number of inadvertently erroneous activation of the radar timer. The receiver control circuit determines if to enable the radar timer to start based on, for instance, a radar timer start mask signal 204 shown in FIG. 3(d) that is output from the radar threshold comparator circuit 141, or the like.

This radar timer start mask signal 204 of FIG. 3(d) is to mask the radar timer start signal 203 so that, after the time-out period expires for a signal pulse, the radar timer is started again for the same signal pulse. The radar timer start mask signal 204 may reduce the number of erroneous radar detection due to repetitions of the starting of the radar timer and the expiration of the time-out period during detection of a signal having a longer signal length than that of a radar signal, such as a signal used in the communication system according to the exemplary embodiment.

The radar timer start mask signal 204 may be started, for instance, at a time of the first radar timer starting as shown in FIG. 3(d) or at a time of the stopping of the radar timer (including an expiration of time-out period). The radar timer start mask may be stopped, for instance, when the output of the received power computing/moving-averaging circuit 12 goes below the radar threshold "b" or a radar threshold other than the radar threshold "b".

Furthermore, in various communication systems, an intrinsic and known preamble, training symbol or unique word may be inserted in a header of a frame of a wireless signal for the purpose of synchronizing the frame or ensuring the reliability of communication. Also, a signal utilized in the communication system according to an exemplary embodiment may have a frame format as shown in FIG. 5 which has a preamble signal intrinsic to that signal and known in advance(short preamble or long preamble in FIG. 5). That is, the preamble signal has a predetermined pattern. In this case, the receiver control circuit 13 may be equipped with a correlation detector (not shown) for detecting correlation between a received signal and the predetermined pattern (i.e., detecting the preamble signal). Accordingly, the radar detection determining circuit 146 may determine that a radar signal based on the fact that the preamble signal is not detected in addition to a result of the detection depicted in FIG. 3 and may reduce the number of erroneous detection of a radar signal.

Further, in the wireless LAN system, the wireless device may utilize the short preamble and the long preamble in order to detect a timing of a signal from the node. Accordingly, the radar detection determining circuit 146 may detect a radar signal based on the fact that no timing has been detected in addition to the conditions to be considered to determine if a radar signal is detected as described above. This method may be effective in reducing erroneous detection of a radar signal when a signal length of a signal utilized in the communication system according to an exemplary embodiment is shorter than a radar pulse width to be detected.

According to an exemplary embodiment, even if the demodulator determines that a radar signal is detected, the wireless device may restrain itself from immediately notifying the higher level protocol of the detection of the radar signal using the radar counter. This may reduce the number of executions of a radar avoidance accompanied by an interruption of communication in the communication system according to the exemplary embodiment.

According to another exemplary embodiment of the present invention, a wireless communication system includes a wireless communication device for detecting radar signals during wireless communication. The wireless communication device is provided with an received power computing means for calculating a received signal power during the wireless communication, a radar detecting means for detecting the radar signals by comparing the received signal power calculated by the received power computing means with a preset radar threshold, and a radar detection determining means for notifying an higher level of a communication protocol of radar detection if the number of detections of the radar signals by the radar detecting means exceeds a predetermined value within a certain period of time.

Furthermore, a program of a radar detection method, embodied on a computer readable medium, according to an exemplary embodiment of the present invention causes a computer of the wireless communication device to calculate a received signal power in the wireless communication, to detect radar signals by comparing the calculated received signal power with a predetermined radar threshold, and to notify an higher level of a communication protocol of radar detection if the number of detections of the radar signals exceeds a predetermined value within a certain period of time.

Thus, the radar detection system or method, according to an exemplary embodiment of the present invention, detects radar signals in a demodulator for a wireless signal utilized in a wireless communication system.

Accordingly, in an exemplary embodiment of the present invention, radar detection can be performed without degrading an efficiency of communication by implementing a radar detecting function for a wireless communication device in conjunction with an operation of receiving a signal utilized in the communication. Furthermore, since a single receiver in a wireless communication device may detect a radar signal as well as receive a signal utilized in a communication system, there are advantages in reduced hardware size and cost of the wireless communication device.

An exemplary embodiment of the present invention provides the effect of permitting a radar detection all the time without degrading communication efficiency.

The present invention is not limited to the above-described exemplary embodiments. For example, the present invention may apply generally to wireless communication devices which are used where both a radar signal and a signal utilized in a communication network are transmitted. Also, the present invention may apply generally to devices for performing wireless communication without affecting a radar operation in a geographical area where a radar signal is transmitted or in a band which a radar signal uses.

Although several exemplary embodiments of the present invention have been described above, it will be understood by those skilled in the art that the present invention should not be limited to the described exemplary embodiments, and various changes and modifications can be made within the spirit and the scope of the present invention.

What is claimed is:

1. A wireless communication device which operates in a communication network, the wireless communication device comprising:
   a receiver circuit which receives a wireless signal that comprises at least one of a signal from a node in the communication network and a radar signal, and detects a received power of the wireless signal; and
   a radar signal detection circuit, coupled to the receiver circuit, which determines that the wireless signal comprises the radar signal if the received power of the wireless signal becomes larger than a predetermined first threshold value and subsequently becomes smaller than a predetermined second threshold value within a predetermined period of time, the predetermined second threshold value being smaller than predetermined first threshold value.

2. The wireless communication device according to claim 1, wherein the radar detection circuit determines that the wireless signal does not comprise the radar signal if the received power becomes larger than the predetermined first threshold value but does not subsequently become smaller than the predetermined second threshold value within the predetermined period of time.

3. The wireless communication device according to claim 1, wherein the signal from the node comprises a signal with a predetermined pattern, and wherein the receiver circuit determines if the wireless signal comprises the signal with the predetermined pattern and the radar detection circuit determines that the wireless signal comprises the radar signal if the receiver circuit determines that the wireless signal does not comprise the signal with predetermined pattern.

4. The wireless communication device according to claim 1, wherein the signal from the node comprises a signal with a predetermined pattern, and wherein the receiver circuit determines if the wireless signal comprises the signal with predetermined pattern and the radar detection circuit determines that the wireless signal comprises the radar signal if the received power becomes larger than the predetermined first threshold value and subsequently becomes smaller than the predetermined second threshold value within the predetermined period of time and the receiver circuit determines that the wireless signal does not comprise the signal with the predetermined pattern.

5. The wireless communication device according to claim 4, wherein the radar detection circuit determines that the wireless signal does not comprise the radar signal if the received power becomes larger than the predetermined first threshold value but does not subsequently become smaller than the predetermined second threshold value within the predetermined period of time.

6. A wireless communication device which operates in a communication network, the wireless communication device comprising:
   receiving means for receiving a wireless signal that comprises at least one of a signal from a node in the communication network and a radar signal;
   detecting means, coupled to the receiving means, for detecting a received power of the wireless signal; and
   determining means, coupled to the detecting means, for determining that the wireless signal comprises the radar signal if the received power of the wireless signal becomes larger than a predetermined first threshold value and subsequently becomes smaller than a predetermined second threshold value within a predetermined period of time, the predetermined second threshold value being smaller than predetermined first threshold value.

7. The wireless communication device according to claim 6, wherein the determining means determines that the wireless signal does not comprise the radar signal if the received power becomes larger than the predetermined first threshold value but does not subsequently become smaller than the predetermined second threshold value within the predetermined period of time.

8. The wireless communication device according to claim 6, wherein the signal from the node comprises a signal with a predetermined pattern, and wherein the receiving means determines if the wireless signal comprises the signal with predetermined pattern and the determining means determines that the wireless signal comprises the radar signal if the receiving means determines that the wireless signal does not comprise the signal with predetermined pattern.

9. The wireless communication device according to claim 6, wherein the signal from the node comprises a signal with a predetermined pattern, and wherein the receiving means determines if the wireless signal comprises the signal with predetermined pattern and the determining means determines that the wireless signal comprises the radar signal if the received power becomes larger than the predetermined first threshold value and subsequently becomes smaller than the predetermined second threshold value within the predetermined period of time and the receiving means determines that the wireless signal does not comprise the signal with the predetermined pattern.

10. The wireless communication device according to claim 9, wherein the determining means determines that the wireless signal does not comprise the radar signal if the received power becomes larger than the predetermined first threshold value but does not subsequently become smaller than the predetermined second threshold value within the predetermined period of time.

11. A method for a communication network, the method comprising:
receiving a wireless signal that comprises at least one of a signal from a node in the communication network and a radar signal;
detecting a received power of the wireless signal; and
determining that the wireless signal comprises the radar signal based on the received power of the wireless signal, comprising:
determining if the received power becomes larger than a predetermined first threshold value and subsequently becomes smaller than a predetermined second threshold value within a predetermined period of time, the predetermined second threshold value being smaller than predetermined first threshold value.

12. The method according to claim 11, wherein the determining if the wireless signal comprises the radar signal further comprises:
determining that the wireless signal does not comprise the radar signal if the received power becomes larger than the predetermined first threshold value but does not subsequently become smaller than the predetermined second threshold value within the predetermined period of time.

13. The method according to claim 11, wherein the signal from the node comprises a signal with a predetermined pattern, the method further comprising:
determining if the wireless signal comprises the signal with predetermined pattern, and
determining that the wireless signal comprises the radar signal if the wireless signal does not comprise the signal with the predetermined pattern.

14. The method according to claim 11, wherein the signal from the node comprises a signal with a predetermined pattern, the method further comprising:
determining if the wireless signal comprises the signal with a predetermined pattern, and wherein determining if the wireless signal comprises the radar signal comprises determining that the wireless signal comprises the radar signal if the received power becomes larger than the predetermined first threshold value and subsequently becomes smaller than the predetermined second threshold value within the predetermined period of time and the wireless signal does not comprise the signal with the predetermined pattern.

15. The method according to claim 14, wherein determining if the wireless signal comprises the radar signal further comprises:
determining that the wireless signal does not comprise the radar signal if the received power becomes larger than the predetermined first threshold value but does not subsequently become smaller than the predetermined second threshold value within the predetermined period of time.

16. The method according to claim 13, further including:
counting a number of sequential radar detections;
comparing the number to a third threshold value; and
generating an upward notification related to the counted number of the sequential radar detections based on comparing.

17. The method according to claim 11, further including:
starting a radar timer when the received power becomes larger than the predetermined first threshold value;
monitoring the radar timer and the received power;
one of stopping the radar timer when the received power becomes smaller than the predetermined second threshold value or expiring the radar timer after a timeout; and
determining one of a presence of the radar signal if the radar timer has been stopped or an absence of the radar signal if the radar timer has been expired.

18. A processor which reads a program stored in a memory, said program, when executed by the processor, causes the processor to perform a method of detecting a radar signal, the method comprising:
receiving a wireless signal that comprises at least one of a signal from a node in the communication network and a radar signal;
detecting a received power of the wireless signal; and
determining that the wireless signal comprises the radar signal based on the received power of the wireless signal, comprising:
determining if the received power becomes larger than a predetermined first threshold value and subsequently becomes smaller than a predetermined second threshold value within a predetermined period of time, the predetermined second threshold value being smaller than predetermined first threshold value.

* * * * *

UNITED STATES PATENT AND TRADEMARK OFFICE
CERTIFICATE OF CORRECTION

| | |
|---|---|
| PATENT NO. | : 7,715,801 B2 |
| APPLICATION NO. | : 11/225020 |
| DATED | : May 11, 2010 |
| INVENTOR(S) | : Makoto Tsuruno |

It is certified that error appears in the above-identified patent and that said Letters Patent is hereby corrected as shown below:

Claim 16, Column 10, Line 31, delete "according to claim 13" and insert --according to claim 11--.

Signed and Sealed this

Fourteenth Day of September, 2010

David J. Kappos
*Director of the United States Patent and Trademark Office*